United States Patent
Reid et al.

(10) Patent No.: US 8,330,844 B2
(45) Date of Patent: *Dec. 11, 2012

(54) METHOD AND APPARATUS FOR IMAGE ACQUISITION, ORGANIZATION, MANIPULATION, AND PUBLICATION

(75) Inventors: Glenn Reid, Woodside, CA (US); Aaron Disario, San Jose, CA (US); Tim Wasko, Santa Clara, CA (US); Daniel B. Waylonis, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 366 days.

This patent is subject to a terminal disclaimer.

(21) Appl. No.: 11/858,785

(22) Filed: Sep. 20, 2007

(65) Prior Publication Data

US 2008/0007625 A1    Jan. 10, 2008

Related U.S. Application Data

(63) Continuation of application No. 10/742,446, filed on Dec. 19, 2003, now Pat. No. 7,289,132, which is a continuation of application No. 10/042,944, filed on Jan. 6, 2002, now Pat. No. 6,850,247.

(51) Int. Cl.
H04N 5/222 (2006.01)
(52) U.S. Cl. ............ 348/333.02; 348/207.1; 348/333.05
(58) Field of Classification Search ............... 348/207.1, 348/333.01, 333.05
See application file for complete search history.

(56) References Cited

U.S. PATENT DOCUMENTS

| | | |
|---|---|---|
| 4,723,209 A | 2/1988 | Hernandez et al. |
| 5,416,900 A | 5/1995 | Blanchard et al. |
| 5,553,225 A | 9/1996 | Perry |
| 5,666,215 A | 9/1997 | Fredlund et al. |
| 5,706,097 A | 1/1998 | Schelling et al. |
| 5,706,457 A | 1/1998 | Dwyer et al. |
| 5,751,287 A | 5/1998 | Hahn et al. |
| 5,835,094 A | 11/1998 | Ermel et al. |
| 5,838,317 A | 11/1998 | Bolnick et al. |
| 5,943,050 A | 8/1999 | Bullock et al. |
| 5,959,624 A | 9/1999 | Johnston, Jr. et al. |
| 5,978,016 A | 11/1999 | Lourette et al. |
| 5,986,670 A | 11/1999 | Dries et al. |

(Continued)

OTHER PUBLICATIONS

Adobe Photoshop 6.0 Operation Guide, Copyright 2000.*

(Continued)

*Primary Examiner* — Anthony J Daniels
(74) *Attorney, Agent, or Firm* — Robert C. Kowert; Meyertons, Hood, Kivlin, Kowert & Goetzel, P.C.

(57) ABSTRACT

To better realize the great potential of amateur digital photography, the present invention introduces an integrated system for the acquisition, organization, manipulation, and publication of digital images by amateur digital photography enthusiasts. The system of the present invention first acquires images from a number of different image sources. Images acquired in the same image importing session are marked as coming from the same conceptual film roll. Next, a user is empowered to organize and manipulate the acquired images. The images may be organized by tagging the images with informative keywords and grouping images together into conceptual photo albums. Furthermore, the images may be manipulated by rotating, cropping, and removing red-eye. Finally, the system of the present invention provides simple intuitive image publish systems. A selected group of images may be published in a photobook, published onto the World Wide Web, or published as individual image prints with minimal computer knowledge on the part of the user.

14 Claims, 9 Drawing Sheets

U.S. PATENT DOCUMENTS

| | | | |
|---|---|---|---|
| 6,028,603 | A | 2/2000 | Wang et al. |
| 6,038,295 | A * | 3/2000 | Mattes ...................... 379/93.25 |
| 6,073,161 | A | 6/2000 | DeBoskey et al. |
| 6,097,389 | A | 8/2000 | Morris et al. |
| 6,111,573 | A | 8/2000 | McComb et al. |
| 6,111,586 | A | 8/2000 | Ikeda et al. |
| 6,151,421 | A | 11/2000 | Yamada |
| 6,154,755 | A | 11/2000 | Dellert et al. |
| 6,181,838 | B1 | 1/2001 | Knowlton |
| 6,202,061 | B1 | 3/2001 | Khosla et al. |
| 6,237,010 | B1 | 5/2001 | Hui et al. |
| 6,301,586 | B1 | 10/2001 | Yang et al. |
| 6,324,545 | B1 | 11/2001 | Morag |
| 6,335,742 | B1 * | 1/2002 | Takemoto ..................... 715/781 |
| 6,362,900 | B1 | 3/2002 | Squilla et al. |
| 6,392,673 | B1 | 5/2002 | Andrew et al. |
| 6,424,385 | B1 * | 7/2002 | Koyama et al. ............... 348/734 |
| 6,431,448 | B1 | 8/2002 | Nelson et al. |
| 6,453,078 | B2 | 9/2002 | Bubie et al. |
| 6,557,017 | B1 | 4/2003 | Venable |
| 6,574,636 | B1 | 6/2003 | Balon et al. |
| 6,601,057 | B1 | 7/2003 | Underwood et al. |
| 6,620,206 | B1 | 9/2003 | Seaman et al. |
| 6,629,104 | B1 * | 9/2003 | Parulski et al. ....................... 1/1 |
| 6,636,648 | B2 | 10/2003 | Loui et al. |
| 6,714,209 | B2 | 3/2004 | Van Valer |
| 6,747,674 | B1 | 6/2004 | Asami |
| 6,781,610 | B2 | 8/2004 | Os et al. |
| 6,784,925 | B1 | 8/2004 | Tomat et al. |
| 6,813,746 | B1 | 11/2004 | O'Shea |
| 6,850,247 | B1 | 2/2005 | Reid et al. |
| 6,856,422 | B1 | 2/2005 | Higashibata et al. |
| 6,912,327 | B1 | 6/2005 | Hori et al. |
| 6,970,185 | B2 | 11/2005 | Halverson |
| 7,003,723 | B1 | 2/2006 | Kremer et al. |
| 7,148,990 | B2 | 12/2006 | Atkins et al. |
| 7,188,310 | B2 | 3/2007 | Schwartzkopf |
| 7,243,079 | B1 | 7/2007 | Manolis et al. |
| 7,289,132 | B1 | 10/2007 | Reid et al. |
| 7,299,268 | B2 | 11/2007 | Kuroiwa et al. |
| 7,394,562 | B2 | 7/2008 | Nakagiri et al. |
| 7,469,380 | B2 | 12/2008 | Wessling et al. |
| 7,629,984 | B2 | 12/2009 | Reid et al. |
| 7,710,439 | B2 | 5/2010 | Reid et al. |
| 7,768,535 | B2 | 8/2010 | Reid et al. |
| 8,013,874 | B2 | 9/2011 | Reid et al. |
| 8,184,130 | B2 | 5/2012 | Reid et al. |
| 2001/0020956 | A1 | 9/2001 | Moir |
| 2001/0035875 | A1 | 11/2001 | Suzuki et al. |
| 2001/0042084 | A1 | 11/2001 | Seaman |
| 2001/0046330 | A1 | 11/2001 | Shaffer et al. |
| 2001/0056434 | A1 | 12/2001 | Kaplan et al. |
| 2002/0000998 | A1 | 1/2002 | Scott et al. |
| 2002/0019833 | A1 | 2/2002 | Hanamoto |
| 2002/0032696 | A1 | 3/2002 | Takiguchi et al. |
| 2002/0040375 | A1 | 4/2002 | Simon et al. |
| 2002/0054059 | A1 | 5/2002 | Schneiderman |
| 2002/0054300 | A1 | 5/2002 | Trenz |
| 2002/0057272 | A1 | 5/2002 | Hamada et al. |
| 2002/0069127 | A1 | 6/2002 | Enari |
| 2002/0126149 | A1 | 9/2002 | Umeda |
| 2002/0145614 | A1 | 10/2002 | Van Valer |
| 2003/0052897 | A1 | 3/2003 | Lin |
| 2003/0055871 | A1 | 3/2003 | Roses |
| 2003/0063770 | A1 | 4/2003 | Svendsen et al. |
| 2003/0072486 | A1 | 4/2003 | Loui et al. |
| 2003/0078994 | A1 | 4/2003 | Ishizuka |
| 2003/0090493 | A1 | 5/2003 | Masuda et al. |
| 2003/0108241 | A1 | 6/2003 | Colmenarez et al. |
| 2003/0128389 | A1 | 7/2003 | Matraszek et al. |
| 2004/0046788 | A1 | 3/2004 | Keane et al. |
| 2004/0100486 | A1 | 5/2004 | Flamini et al. |
| 2004/0133924 | A1 | 7/2004 | Wilkins et al. |
| 2004/0175764 | A1 | 9/2004 | Nishiyama et al. |
| 2004/0179115 | A1 * | 9/2004 | Tomat et al. ............... 348/231.6 |
| 2004/0201715 | A1 | 10/2004 | Ishimura et al. |
| 2005/0091599 | A1 | 4/2005 | Yamakado et al. |
| 2005/0149969 | A1 | 7/2005 | Kumar et al. |
| 2005/0166159 | A1 | 7/2005 | Mondry et al. |
| 2005/0195214 | A1 | 9/2005 | Reid et al. |
| 2005/0225799 | A1 * | 10/2005 | Berarducci et al. .......... 358/1.15 |
| 2005/0278625 | A1 | 12/2005 | Wessling et al. |
| 2006/0059427 | A1 | 3/2006 | Reid et al. |
| 2006/0064635 | A1 | 3/2006 | Reid et al. |
| 2006/0064639 | A1 | 3/2006 | Reid et al. |
| 2006/0109516 | A1 | 5/2006 | Catalan et al. |
| 2006/0109517 | A1 | 5/2006 | Catalan et al. |
| 2006/0181736 | A1 | 8/2006 | Quek et al. |
| 2007/0180374 | A1 | 8/2007 | Gormish |
| 2008/0111829 | A1 | 5/2008 | Reid et al. |
| 2010/0037128 | A1 | 2/2010 | Reid et al. |
| 2011/0292073 | A1 | 12/2011 | Reid et al. |
| 2011/0296326 | A1 | 12/2011 | Reid et al. |

OTHER PUBLICATIONS

U.S. Appl. No. 11/032,322, filed Jan. 9, 2005, Fagans, Joshua, et al.
Notice of Allowance of, Sep. 23, 2004 (mailing date), Reid, Glenn, et al.
U.S. Appl. No. 10/042,944.
Notice of Allowance of U.S. Appl. No. 10/742,446, Jun. 4, 2007 (mailing date), Reid, Glenn, et al.
Non-Final Office Action for U.S. Appl. No. 11/022,046, Sep. 18, 2008 (mailing date), Reid, Glenn, et al.
Final Office Action for U.S. Appl. No. 11/022,046, Mar. 17, 2008 (mailing date), Reid, Glenn, et al.
Final Office Action for U.S. Appl. No. 11/272,255, Sep. 17, 2008 (mailing date), Reid, Glenn, et al.
Non-Final Office Action for U.S. Appl. No. 11/272,258, Jun. 24, 2008 (mailing date), Reid, Glenn, et al.
Non-Final Office Action for U.S. Appl. No. 11/927,562, Oct. 16, 2008 (mailing date), Reid, Glenn, et al.
Non-Final Office Action for U.S. Appl. No. 11/032,322, Nov. 27, 2006 (mailing date), Fagans, Joshua, et al.
Final Office Action for U.S. Appl. No. 11/032,322, Dec. 10, 2007 (mailing date), Fagans, Joshua, et al.
Non-Final Office Action for U.S. Appl. No. 11/032,322, Jan. 5, 2009 (mailing date), Fagans, Joshua, et al.
Non-Final Office Action for U.S. Appl. No. 10/042,944, Sep. 18, 2003 (mailing date), Reid, et al.
Final Office Action for U.S. Appl. No. 10/042,944, Mar. 18, 2004 (mailing date), Reid, et al.
Non-Final Office Action for U.S. Appl. No. 10/742,446, Feb. 2, 2005 (mailing date), Reid, et al.
Final Office Action for U.S. Appl. No. 10/742,446, Sep. 9, 2005 (mailing date), Reid, et al.
Non-Final Office Action for U.S. Appl. No. 10/742,446, Mar. 14, 2006 (mailing date), Reid, et al.
Final Office Action for U.S. Appl. No. 10/742,446, Oct. 6, 2006 (mailing date), Reid, et al.
Non-Final Office Action for U.S. Appl. No. 11/022,046, Aug. 22, 2005 (mailing date), Reid, et al.
Final Office Action for U.S. Appl. No. 11/022,046, Feb. 8, 2006 (mailing date), Reid, et al.
Non-Final Office Action for U.S. Appl. No. 11/022,046, Sep. 28, 2006 (mailing date), Reid, et al.
Final Office Action for U.S. Appl. No. 11/022,046, Mar. 9, 2007 (mailing date), Reid, et al.
Non-Final Office Action for U.S. Appl. No. 11/022,046, Aug. 30, 2007 (mailing date), Reid, et al.
Non-Final Office Action for U.S. Appl. No. 11/272,255, Dec. 19, 2006 (mailing date), Reid, et al.
Final Office Action for U.S. Appl. No. 11/272,255, May 25, 2007 (mailing date), Reid, et al.
Non-Final Office Action for U.S. Appl. No. 11/272,255, Feb. 8, 2008 (mailing date), Reid, et al.
Non-Final Office Action for U.S. Appl. No. 11/272,258, Feb. 6, 2007 (mailing date), Reid, et al.
Final Office Action for U.S. Appl. No. 11/272,258, Oct. 31, 2007 (mailing date), Reid, et al.
Portions of prosecution history of U.S. Appl. No. 10/042,944, filed Sep. 14, 2004, Reid, Glenn, et al.

Portions of prosecution history of U.S. Appl. No. 10/742,446, filed Aug. 31, 2007, Reid, Glenn, et al.
Portions of prosecution history of U.S. Appl. No. 11/022,046, filed Oct. 26, 2009, Reid, Glenn, et al.
Portions of prosecution history of U.S. Appl. No. 11/272,255, filed Dec. 1, 2009, Reid, Glenn, et al.
Portions of prosecution history of U.S. Appl. No. 11/272,235, filed Sep. 17, 2009, Reid, Glenn, et al.
Portions of prosecution history of U.S. Appl. No. 11/272,258, filed Jun. 15, 2009, Reid, Glenn, et al.
Portions of prosecution history of U.S. Appl. No. 11/927,562, filed Dec. 17, 2009, Reid, Glenn, et al.
U.S. Appl. No. 12/498,354, filed Jul. 6, 2009, Reid, Glenn, et al.
Portions of prosecution history of U.S. Appl. No. 12/498,354, filed Oct. 26, 2009, Reid, Glenn, et al.
Response to Non-Final Office Action of U.S. Appl. No. 11/272,235, Sep. 17, 2009 (mailing date), Reid, Glenn, et al.
Updated portions of prosecution history of U.S. Appl. No. 11/272,255, filed Feb. 3, 2010, Reid, Glenn, et al.
Updated portions of prosecution history of U.S. Appl. No. 11/272,235, filed Aug. 16, 2010, Reid, Glenn, et al.
Updated portions of prosecution history of U.S. Appl. No. 11/927,562, filed Jul. 8, 2010, Reid, Glenn, et al.
Bunzel, Tom, "Sams Teach Yourself Microsoft Office PowerPoint 2003 in 24 hours," Sep. 2003, pp. 1-6.
Bunzel, Tom, "Sams Teach Yourself Microsoft Office PowerPoint 2003 in 24 hours," Sep. 2003, pp. L1, L2.
Author Unknown, "Step by Step Microsoft FrontPage," 2001, version 2002, pp. 35-39, Microsoft Press, WA.
Millhollon, Mary et al., Microsoft Office Word 2003 Inside Out, Nov. 5, 2003, Microsoft Press.
Updated portions of prosecution history of U.S. Appl. No. 10/042,944, filed Sep. 23, 2004, Reid, Glenn, et al.
Updated portions of prosecution history of U.S. Appl. No. 10/742,446, filed Oct. 12, 2007, Reid, Glenn, et al.
Updated portions of prosecution history of U.S. Appl. No. 11/022,046, filed Nov. 2, 2009, Reid, Glenn, et al.
Updated portions of prosecution history of U.S. Appl. No. 11/272,255, filed Feb. 8, 2010, Reid, Glenn, et al.
Updated portions of prosecution history of U.S. Appl. No. 11/272,235, filed Jan. 19, 2011, Reid, Glenn, et al.
Updated portions of prosecution history of U.S. Appl. No. 11/272,258, filed Jul. 1, 2010, Reid, Glenn, et al.
Updated portions of prosecution history of U.S. Appl. No. 11/927,562, filed Jan. 20, 2011, Reid, Glenn, et al.
Updated portions of prosecution history of U.S. Appl. No. 11/272,235, filed Jul. 26, 2011, Reid, Glenn, et al.
Updated portions of prosecution history of U.S. Appl. No. 11/927,562, filed Jun. 28, 2011, Reid, Glenn, et al.
Updated portions of prosecution history of U.S. Appl. No. 11/022,046, filed May 20, 2008, Reid, Glenn, et al.
Updated portions of prosecution history of U.S. Appl. No. 11/272,235, filed Apr. 14, 2011, Reid, Glenn, et al.
Updated portions of prosecution history of U.S. Appl. No. 11/927,562, filed Apr. 20, 2011, Reid, Glenn, et al.
Chastain, Sue, "How to Remove Red Eye in Photoshop (any Version)," printed on Apr. 7, 2011, p. 1, About.com, Graphics Software.
Updated portions of Prosecution History of U.S. Appl. No. 11/927,562, filed Mar. 9, 2012, Reid, Glenn, et al.
Updated portions of Prosecution History of U.S. Appl. No. 12/498,354, filed Feb. 14, 2012, Reid, Glenn, et al.
Updated portions of Prosecution History of U.S. Appl. No. 13/205,592, filed Mar. 14, 2012, Reid, Glenn, et al.
Updated portions of Prosecution History of U.S. Appl. No. 11/927,562, filed Dec. 20, 2011, Reid, Glenn, et al.
Updated portions of Prosecution History of U.S. Appl. No. 12/498,354, filed Dec. 28, 2011 Reid, Glenn, et al.
Portions of Prosecution History of U.S. Appl. No. 13/205,584, filed Jan. 10, 2012, Reid, Glenn, et al.
Portions of Prosecution History of U.S. Appl. No. 13/205,592, filed Dec. 14, 2011, Reid, Glenn, et al.
Updated portions of Prosecution History of U.S. Appl. No. 12/498,354, filed May 14, 2012, Reid, Glenn, et al.
Updated portions of Prosecution History of U.S. Appl. No. 13/205,584, filed Apr. 13, 2012, Reid, Glenn, et al.
Updated portions of Prosecution History of U.S. Appl. No. 13/205,592, filed Apr. 5, 2012, Reid, Glenn, et al.
Updated portions of Prosecution History of U.S. Appl. No. 12/498,354, filed Jun. 14, 2012, Reid, Glenn, et al.
Updated portions of Prosecution History of U.S. Appl. No. 13/205,584, filed May 30, 2012, Reid, Glenn, et al.

* cited by examiner

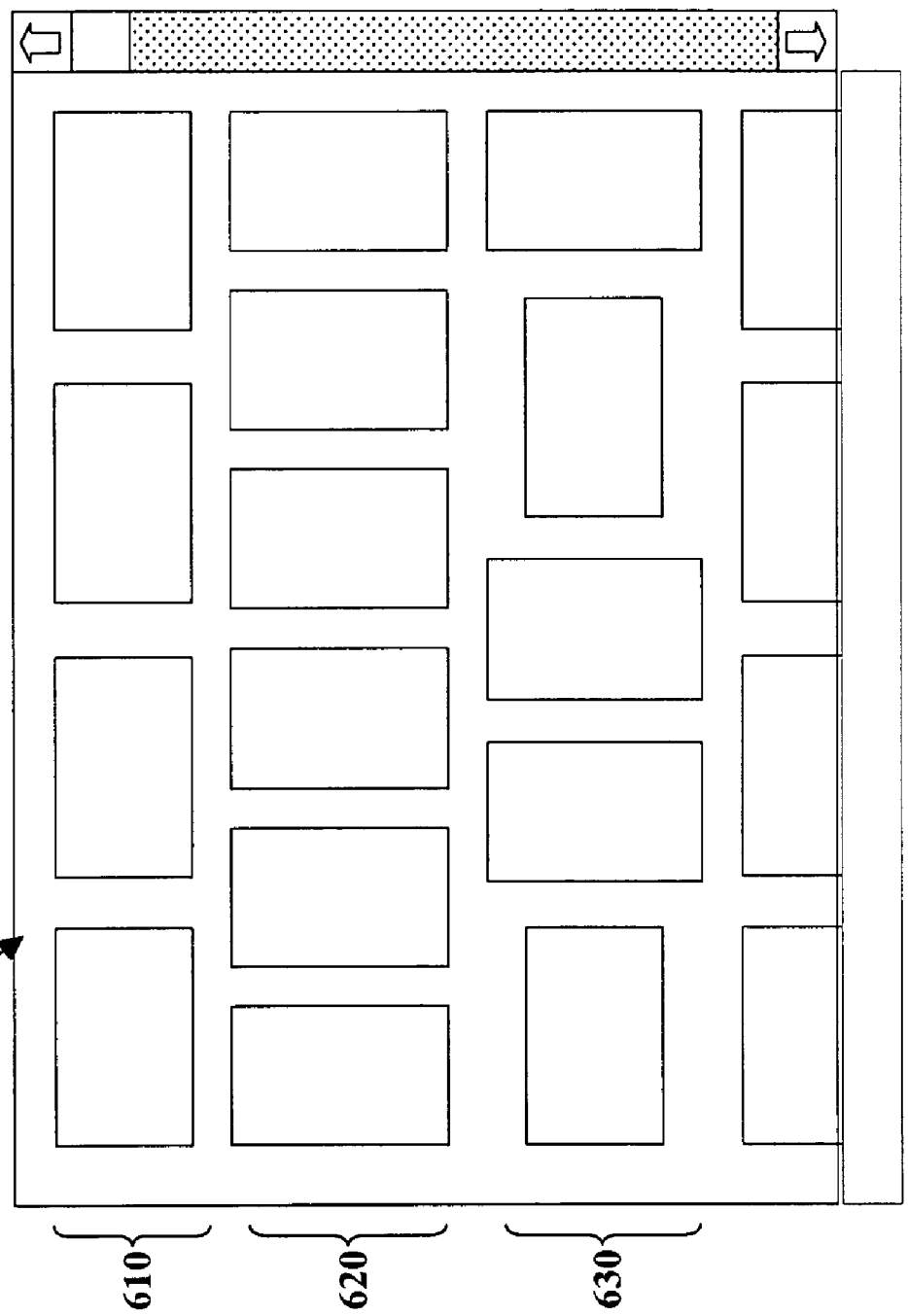

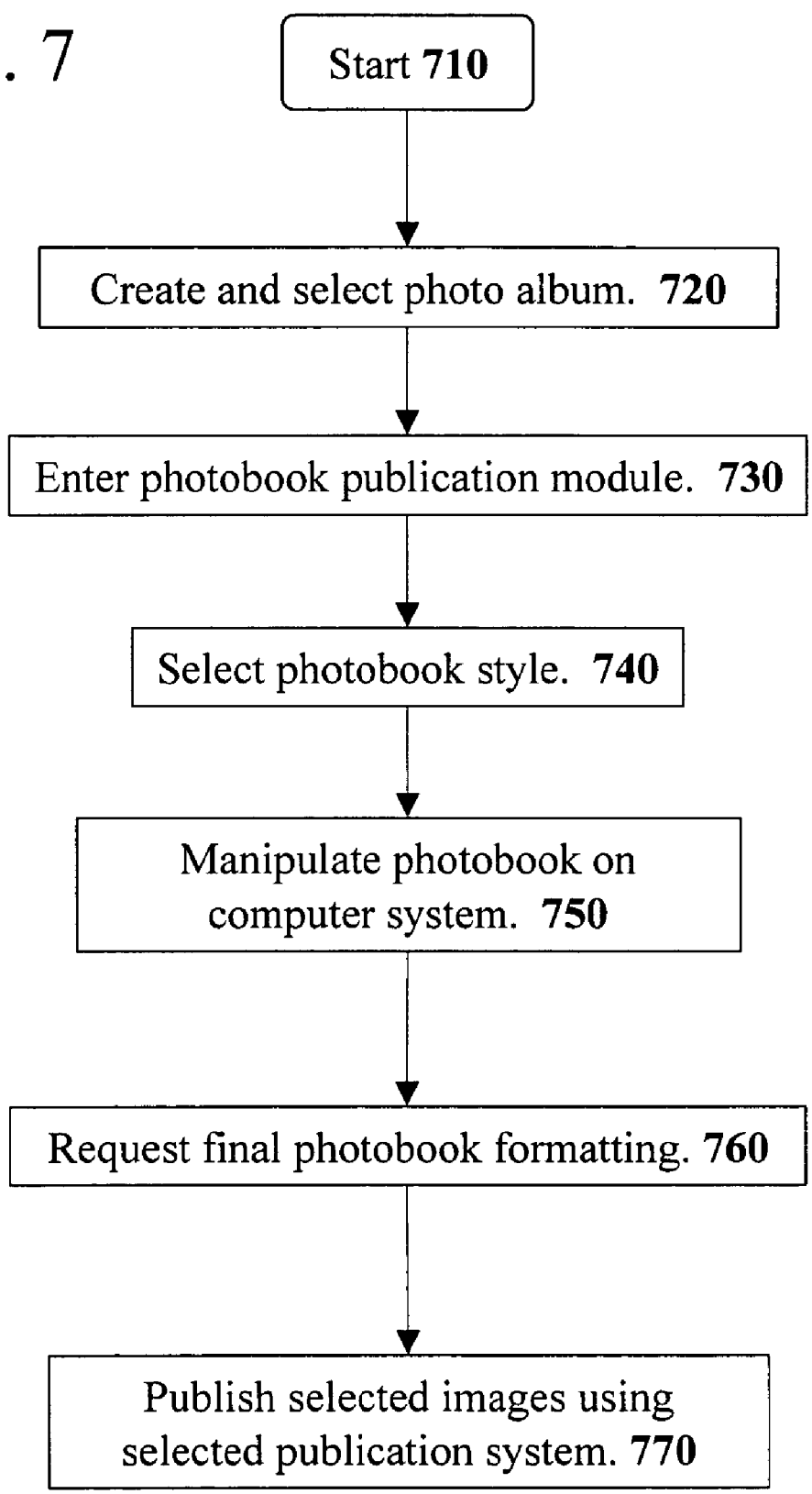

METHOD AND APPARATUS FOR IMAGE ACQUISITION, ORGANIZATION, MANIPULATION, AND PUBLICATION

CLAIM OF BENEFIT TO PRIOR APPLICATIONS

This Application is a continuation application of U.S. patent application Ser. No. 10/742,446, filed Dec. 19, 2003 now U.S. Pat. No. 7,289,132. U.S. patent application Ser. No. 10/742,446 is a continuation application of U.S. patent application Ser. No. 10/042,944, now U.S. Pat. No. 6,850,247, filed Jan. 6, 2002. These applications are incorporated herein by reference.

CROSS-REFERENCE TO RELATED APPLICATIONS

This Application is related to the following applications: U.S. patent application Ser. No. 11/022,046, filed Dec. 22, 2004; U.S. patent application Ser. No. 11/272,255, filed Nov. 9, 2005; U.S. patent application Ser. No. 11/272,235, filed Nov. 9, 2005; and U.S. patent application Ser. No. 11/272,258, filed Nov. 9, 2005. These applications are incorporated herein by reference.

FIELD OF THE INVENTION

The present invention relates to the field of digital photography. In particular the present invention discloses an intuitive system for digital image acquisition, organization, manipulation, and publication.

BACKGROUND OF THE INVENTION

With traditional amateur film photography, the process often ends after a film roll has been developed and returned to the photographer. The photographer obtains the developed photographs in an envelope and reviews the photographs with friends and family. Some energetic amateur photographers select their favorite photographs and place those photographs into a photo album. However, most amateur photographs simply end up in a shoebox at the back of the closet. Occasionally, the shoebox is retrieved such that friends and family may view the photographs.

With the advent of digital photography, the possibility for organizing and publishing amateur photographs has greatly increased. Amateur photographs can be published on the world-wide web (WWW) to allow anyone on the Internet to view the photographs. Image manipulation programs can be used to manipulate digital photographs in order to correct flaws, modify colors, etc. However, the potential of amateur digital photography largely remains unrealized. Most digital photographs are just stashed away on hard disk drives are burned onto Compact Disc Read-Only Memories (CD-ROMs) and only occasionally viewed. A few digital photographs are emailed to friends and family.

To better realize the great potential of amateur digital photography, it is clear that better tools are needed for amateur digital photography enthusiasts. These tools should be highly intuitive yet provide powerful features for the acquisition, organization, manipulation, and publication of digital images.

SUMMARY OF THE INVENTION

To better realize the great potential of amateur digital photography, the present invention introduces an integrated system for the acquisition, organization, manipulation, and publication of digital images by amateur digital photography enthusiasts. The system of the present invention first acquires images from a number of different image sources. Images acquired in the same image importing session are marked as coming from the same conceptual film roll. Next, a user is empowered to organize and manipulate the acquired images. The images may be organized by tagging the images with informative keywords and grouping images together into conceptual photo albums. The images may be manipulated by rotating, cropping, and removing red-eye. Finally, the system of the present invention provides simple intuitive image publish systems. A selected group of images may be published in a photobook, published onto the World Wide Web, or published as individual image prints with minimal computer knowledge on the part of the user.

Other objects, features, and advantages of present invention will be apparent from the company drawings and from the following detailed description.

BRIEF DESCRIPTION OF THE DRAWINGS

The objects, features, and advantages of the present invention will be apparent to one skilled in the art in view of the following detailed description in which:

FIG. 6 illustrates an example of a main image review window that displays thumbnail images with view packing system of the present invention.

FIG. 7 illustrates a flow diagram describing the flow of producing a photobook using the system of the present invention.

DETAILED DESCRIPTION OF THE PREFERRED EMBODIMENT

A method and apparatus for the acquisition, organization, manipulation, and publication of digital images is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to publishing images in a photobook, on a World Wide Web page, and as individual photographic prints. However, the system of the present invention can be used to publish images in other formats such as postcards, magazines, and email messages.

Image Manipulation & Publishing System Overview

Figure 1:
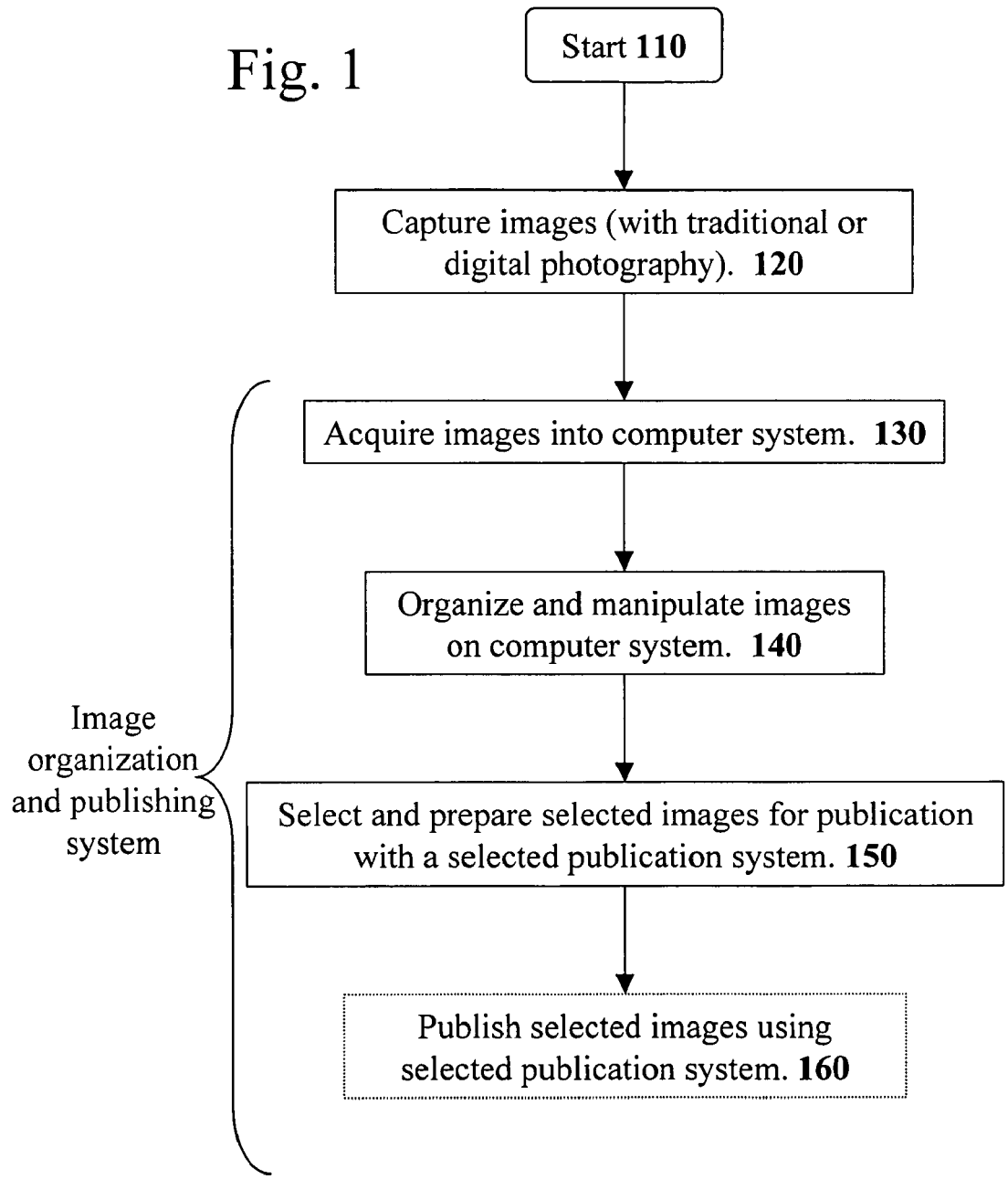
FIG. 1 illustrates a flow diagram that describes the over all flow from image acquisition to image publication using the system of the present invention.

To better realize the great potential of amateur digital photography, the present invention introduces an integrated system for the acquisition, organization, manipulation, and publication of digital images by amateur digital photography enthusiasts. FIG. 1 illustrates a flow diagram that describes the over all flow from image acquisition to image publication using the image organization and publishing system of the present invention.

Image Processing Flow

Referring to step 120 of FIG. 1, the first task is to capture images that will be organized, manipulated, and published. The system of the present invention does not deal with the image capture stage since that stage is the purview of digital cameras and color scanner systems. Note that the images may be captured in any original source format (chemical film photography or electronic digital photography) as long as a digital version of the original source image is available.

The image organization and publishing system of the present invention begins at step 130 where image acquisition is performed. The goal of the image acquisition step is to get the images onto a computer system that will be used to organize, manipulate, and publish the images. The system of the present invention allows digital images to be acquired from various different sources such as digital cameras, CD-ROMS, and across computer networks. The image acquisition system of the present invention records certain information to help organize the images.

After acquiring the captured images on the computer system, the acquired images are organized and manipulated at step 140. The image organization and publishing system of the present invention provides a number of intuitive yet powerful tools for organizing and manipulating the acquired images.

At step 150, the user of the image organization and publishing system of the present invention selects a set of desired images for publication. The user further selects a particular image publication system to use since the system of the present invention uses an open architecture that provides more than one image publication system and allows additional publications systems to be added later.

Finally, at step 160 in FIG. 1, the image organization and publishing system of the present invention publishes the selected images using the selected publication system. Step 160 is illustrated in a dotted box because not all of the work in step 160 will be performed by the image organization and publishing system of the present invention. For example, for certain publication systems, the image organization and publishing system will send processed image data to another outside system that will provide an end result such as a published photo book.

Image Processing Computer System

Figure 2:
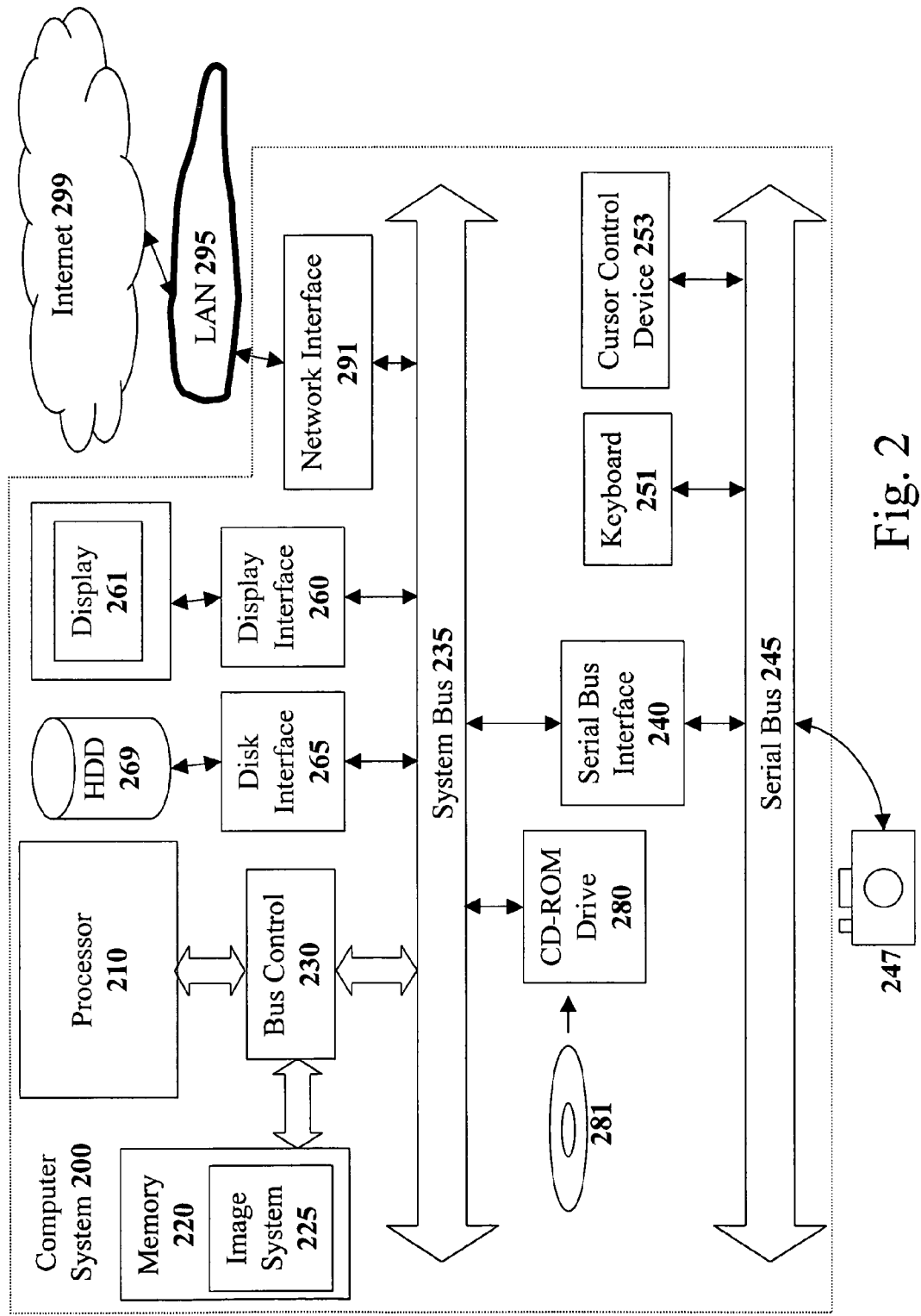
FIG. 2 illustrates a block diagram of a computer system that may be used to implement the teachings of the present invention.

FIG. 2 illustrates an exemplary embodiment of a computer system 200 that may be used to implement the teachings of the present invention. Computer system 200 may be a typical personal computer system with a processor 210, a memory 220, and a bus controller 230 for controlling a system bus 235. Various different Input/Output devices may be coupled to the system bus 235 to allow the computer system 200 to interact with the outside world. For example, computer system 200 includes the input/output devices of a hard disk drive (HDD) 269, a display device 261 (such as a CRT or flat panel display), a keyboard 251, a cursor control device 253 (such as a computer mouse or track pad), a Compact Disc Read-Only-Memory (CD-ROM) Drive 280, and network interface 291 for coupling to a network such as local area network (LAN) 295.

The image organization and publishing system 225 of the present invention resides in the memory 220 of computer system 200 as a set of computer instructions. The image organization and publishing system may also reside as a program on a media device such as CD-ROM 281 used with CD-ROM drive 280. Alternatively, the image organization and publishing system may be obtained across a network such as the global Internet 299 accessible through network interface 291.

Image Acquisition

Referring back to step 130 in FIG. 1, the first task of the image organization and publishing system of the present invention is to acquire digital images to process. Referring to FIG. 2, the acquired images are normally stored onto a mass storage device such as hard disk drive (HDD) 269. In one embodiment of the present invention, the image organization and publishing system 225 may acquire digital images from a number of different sources.

Digital Camera Image Acquisition

In a preferred embodiment of the present invention, the image organization and publishing system of the present invention includes driver software necessary to automatically identify and interoperate with several different types of digital cameras that may be coupled to the host computer system.

For example, FIG. 2 illustrates a digital camera system 247 coupled to serial bus 245 controlled by serial bus interface 240 of the computer system 200. Serial bus 245 may be a Universal Serial Bus (USB), an IEEE 1394 Firewire serial bus, or any other type of serial bus.

In a preferred embodiment, image organization and publishing system 225 is able to automatically recognize when digital camera system 247 is coupled to computer system 200 such that the digital images in digital camera system 247 can be acquired. In one embodiment, the image organization and publishing system 225 would ask the user if he or she would like to delete the transferred images off of digital camera system 247 such that the same digital images would not be transferred again at a later time.

Other Image Acquisition Means

The image organization and publishing system 225 can also acquire images in a number of other manners. For example, film photographs may be placed onto a floppy disc (not shown) or onto CD-ROM 281 by the film developer at the request of the film photographer. Such photos may be acquire by image organization and publishing system 225 by having the user place the floppy disc (not shown) or CD-ROM 281 into the appropriate drive such as floppy disc drive (not show) or CD-ROM drive 280.

Images may also be obtained through a computer network interface 291 of computer system 200. For example, a user may obtain images from a World Wide Web (WWW) site on the global Internet 299. Finally, images may also be obtained using a scanner (not shown) coupled to computer system 200 as is well known in the art.

Image Set Grouping

When the image organization and publishing system 225 acquires a set of images, the image organization and publishing system 225 identifies all the images in some manner to indicate that the set of images are related. This objective may be achieved by marking all the images in the set with a unique set identifier. In this manner, a set of images that are likely to be related will be kept together.

For example, when a user couples digital camera system 247 to computer system 200, the image organization and publishing system 225 may recognize digital camera system 247 and inform the user that images may be transferred from digital camera system 247. If the user transfers images from digital camera system 247 onto computer system 200, the image organization and publishing system 225 indicates that all the images transferring during that session are related. As previously set forth, this may be achieved by marking all the images in the set with a unique set identifier. Alternatively, the transferred images may all be given the same file creation date and time such that any program accessing those transferred images could infer that the images are related since the images were all created at the same date and time.

Image Organization and Manipulation

Figure 3:
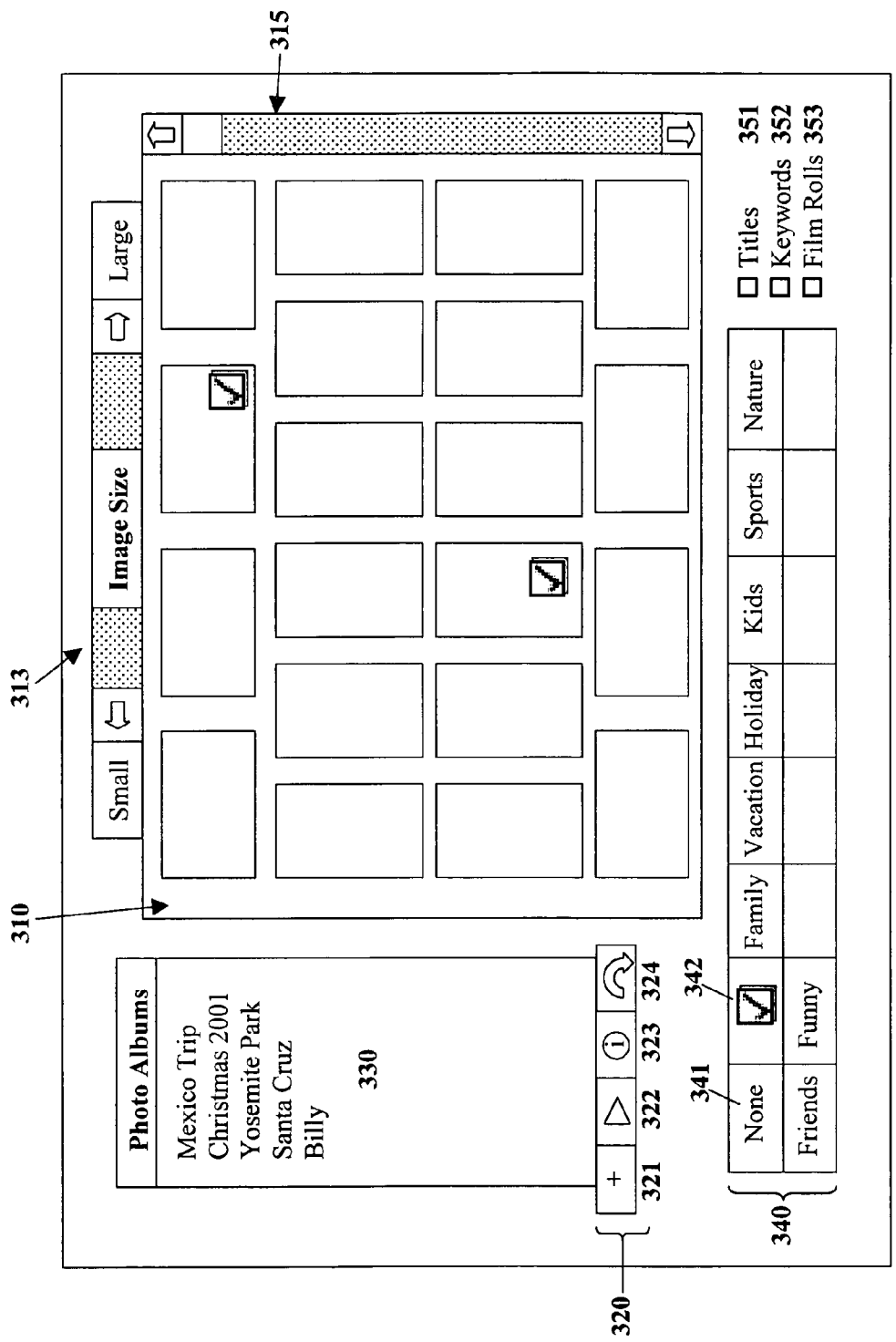
FIG. 3 illustrates one embodiment of the main display screen of the image organization and publishing system of the present invention.

Once images have been acquired into the computer system 200 used by the image organization and publishing system 225, the image organization and publishing system 225 displays the images to the user such that the user may organize, manipulate, and publish the images. FIG. 3 illustrates one embodiment of the main display screen 300 of the image organization and publishing system 225.

Referring to FIG. 3, a main image review window 310 allows the user to view all the images that have been acquired in the image organization and publishing system. The available digital images are displayed as thumbnail summary images within main image review window 310.

The size of the thumbnail summary images displayed within main image review window 310 may be varied using image size slider 313. By setting the image size slider 313 to make the thumbnail images very small, a large number of images may be viewed simultaneously within main image review window 310. Conversely, by setting the image size slider to make the images large, fewer images may be view simultaneously but more detail can be seen in each image displayed. The user may scroll through the various images using scroll bar 315. The main image review window 310 acts as the "shoebox" for storing all the images available to the user.

Film Roll Concept

As set forth in the previous section, images that are acquired into the image organization and publishing system at the same time are grouped together into a related set. In one embodiment, such groupings are conceptually viewed as different "film rolls".

Figure 4:
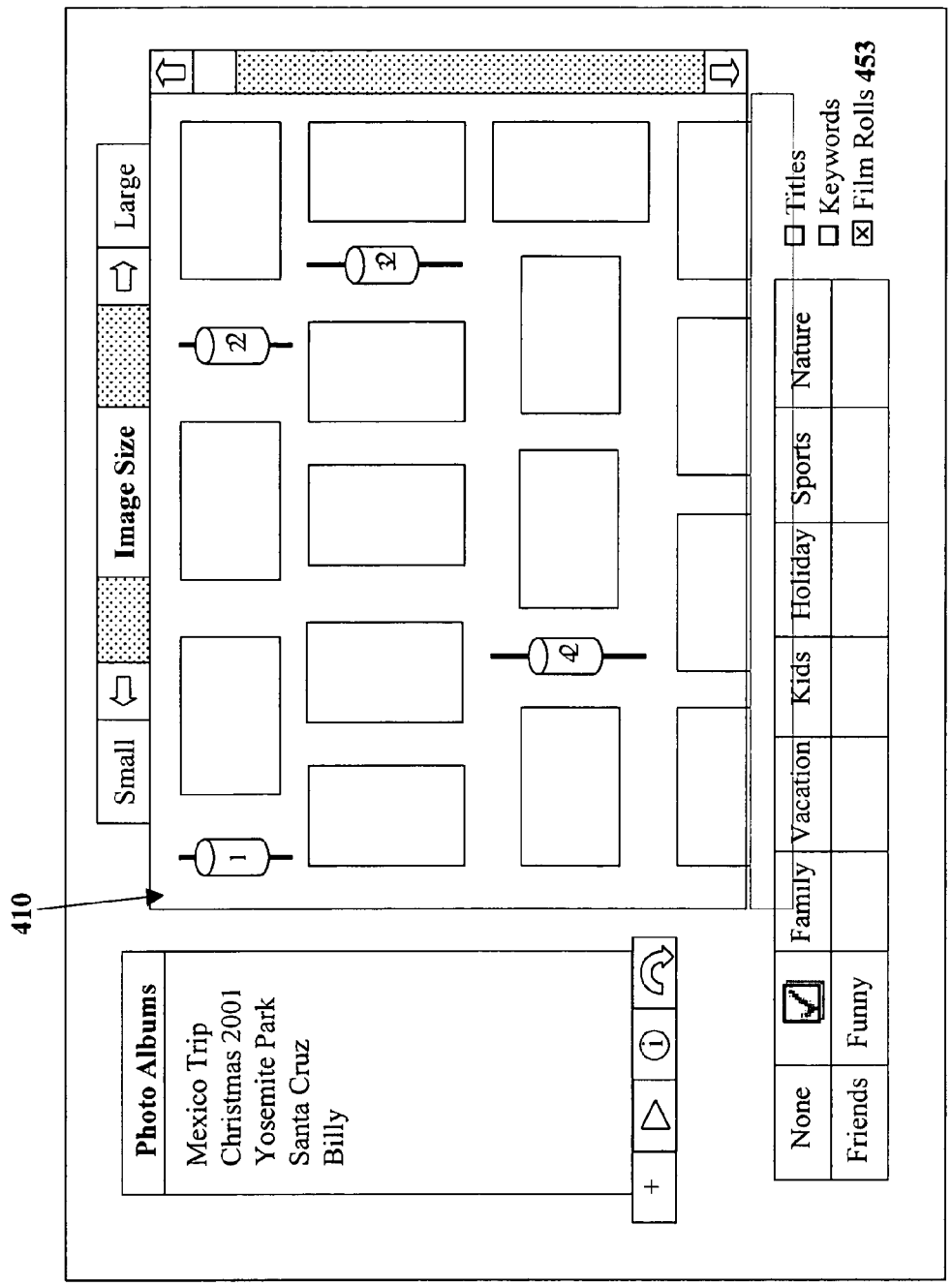
FIG. 4 illustrates a view of the main display screen with film roll dividers appearing between different groups of images acquired into the image organization and publishing system at different times.

The main image review window 310 can be used to display such film roll groupings. FIG. 4 illustrates a view of the main display screen with a "film roll" checkbox 453 checked such that film roll dividers appear between different groups of images acquired into the image organization and publishing system at different times. Specifically, the first two images are from a first "film roll" (image acquisition time), the next five images are from a second film roll, the two images are from a third film roll, and so on.

View Packing

The images displayed in the main image review window are presented in an aesthetically pleasing manner that optimizes the use of space. Specifically, the present invention introduces a "view packing" system that is analogous to proportional spacing in written documents.

Figure 5C:
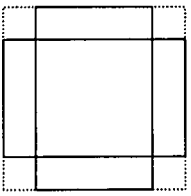
FIG. 5c illustrates a dotted line square box that ensures either a landscape or a portrait image will fit within its borders.
Figure 5B:
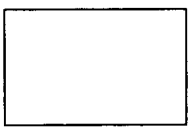
FIG. 5b illustrates the portrait aspect ratio for an image.
Figure 5A:
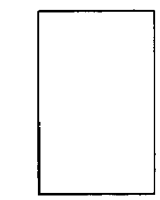
FIG. 5a illustrates the landscape aspect ratio for an image.

Images generally come in two different aspect formats: landscape and portrait. FIG. 5a illustrates the landscape format named since that format is generally used when photographing landscape images. FIG. 5b illustrates the portrait format that is generally used when taking a portrait photograph of human.

Figure 5D:
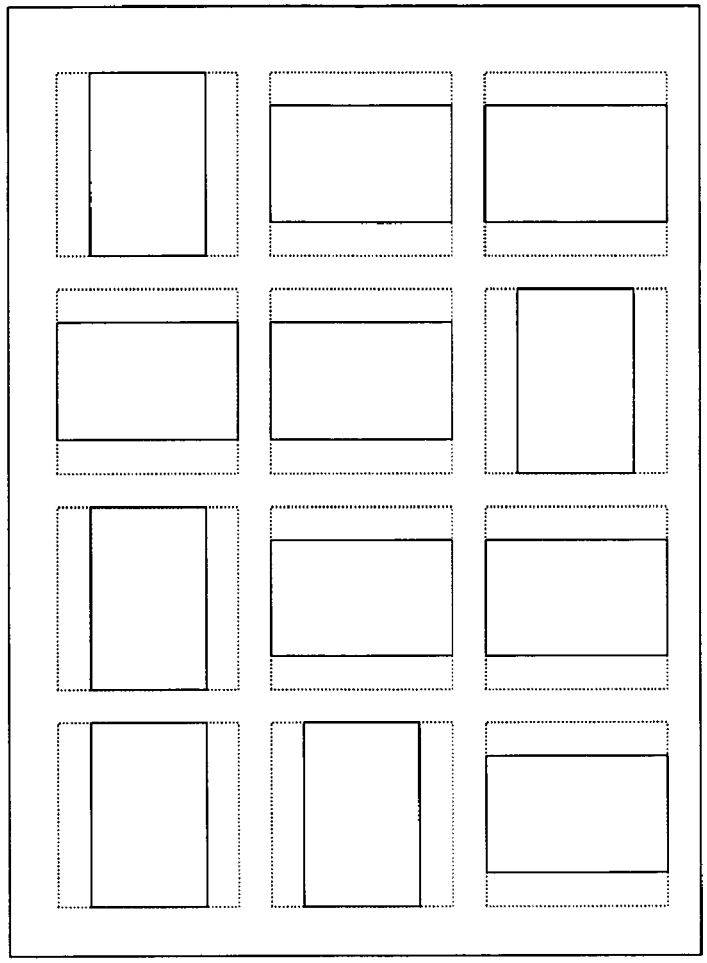
FIG. 5d illustrates an example of image review window that displays images using the dotted line square box of FIG. 5c.

One method of displaying both landscape and portrait images together in an organized manner is to reserve a space for either shaped image. FIG. 5c illustrates a dotted line square box that ensures either a landscape or a portrait image will fit within its borders. FIG. 5d illustrates an example of image review window that displays images using the dotted line square box of FIG. 5c.

To more efficiently use display screen real estate, the view packing system of the present invention sequentially examines the ordered list of images and, for each image row, takes as many images as will fit on a row with an allowance for a minimum space between images. If there are a large number of consecutive narrow portrait images, then a large number of images will be displayed on a particular row. Alternatively, if there are a large number of consecutive wider landscape images, then fewer images will be displayed on a row.

FIG. 6 illustrates an example of a main image review window 600 that displays thumbnail images with view packing. Referring to the first row 610 of main image review window 600, only four landscape images could fit in the row. The extra horizontal space for row 610 was uniformly placed between the landscape images.

In the second row, row 620, six narrow portrait images are presented. The narrow portrait images thus allow more images to be displayed on a particular row. However, note that row 620 is taller than row 610 that only contains landscape images.

Row 630 contains two landscape images and three portrait images. Due the presence of the tall portrait images, the mixed row 630 takes as much vertical space as portrait only row 620. However, the narrow portrait images do allow for some efficiency in the horizontal direction such that five images are displayed in row 630. Note that in mixed row 630, all the images (both portrait and landscape) are centered in the vertical direction.

By comparing the view packing system of FIG. 6 to the prior art system of FIG. 5, one can easily see the display screen real estate efficiencies of the view packing system of the present invention.

Image Keyword Tagging

To help organize the images in the user's "shoebox", the present invention provides an intuitive keyword tagging system. Referring back to FIG. 3, the main display screen 300 includes a keyword tagging bar 340 for tagging images in the main image review window 310.

To tag a particular image or a set of images, a user simply selects the desired image or images in the main image review window 310 and then clicks on one of the keywords in the keyword tagging bar 340. To display all the keyword tags associated with the images, the user may click the "keywords" checkbox 352 such that keywords associated with an image are display below that image in the main image review window 310. Similarly, the user may display titles associated with each image by clicking on the titles checkbox 351.

The keyword tagging bar 340 initially contains a number of common keywords that are relevant to photographs. For example, the keywords "Family", "Vacation", and "Holiday" allow a person to tag images as being related to their family members, their vacations, or holiday celebrations, respectively. However, empty spaces are available on the keyword tagging bar 340 to allow the user to create their own personal keywords. In one embodiment, the user may apply a "keyword filter" such that the main image review window 310 only displays images containing a particular keyword or set of keywords.

Two special keywords, "none" 341 and "☑" 342, are also presented on the keyword tagging bar 340. The "none" 341 keyword specifies that an image should have no keyword tags. Thus, the "none" 341 keyword can be used to clear existing keywords on an image.

The "☑" 342 (check) keyword is a special keyword that is displayed on the front of the thumbnail version of an image in the main image review window 310. The "☑" 342 keyword is used to provide the user with a means for selecting a particular image from a group of similar images. For example, the top row of images in the main image review window 310 may contain four images of the same landscape. The user may carefully review all four images and select the third as the best image of the four images of the same landscape. To remember that selection, the user may mark the third image using the "☑" 342 keyword button. Thus, the user will be reminded of that choice as illustrated by the ☑ icon on the third image of the first row.

Photo Albums

To further organize the images, a user of the image organization and publishing system allows the user to create conceptual "photo albums." A photo album is a specific ordered list of images from the overall shoebox containing all the images. Each photo album is given a descriptive title.

Referring again to FIG. 3, the photo album list area 330 contains a list of photo albums. In FIG. 3, there are five photo albums titled "Mexico Trip", "Christmas 2001", "Yosemite Park", "Santa Cruz", and "Billy." In one embodiment, a user may view the images in a particular photo album by selecting the name of the photo album such that only the images from that photo album are display in the main image review window 310. Note that images in a photo album are in a specific order and that order is reflect in the main image review window 310. The user may rearrange the order of the images by dragging and dropping the images within main image review window 310.

To create a new photo album, the user clicks on new album button 321 that is marked with a "+". The user provides a descriptive name for the new photo album and then may begin dragging images from the shoebox and dropping the images onto the name of the new photo album. Additional information may be obtained about a particular photo album by selecting the photo album name and then clicking the information button 323.

To generate a quick slide show of the images in a photo album, the user may select a particular photo album name and then click the slide show "play" button 322. The image organization and publishing system will then sequentially display the images in full screen form on the display system. A music track may be selected to accompany the slide show.

The slide show "play" button 322 may also be used to create a slide show of any group of images. Specifically, the user may select any group of images in the main image review window 310 and then click the slide show "play" button 322 to create a slide show of the selected images.

Image Editing

The image organization and publishing system of the present invention provides a set of features for editing the acquired images. Most of the image editing tools are available in a separate image editing mode. However, referring to FIG. 3, an image in the main image review window 310 may be rotated by selecting the image and then clicking the rotate button 324 that will rotate the image ninety degrees clockwise. Images may be rotated counter-clockwise by holding down the keyboard shift key while clicking the rotate button 324.

In an image-editing mode, the present invention provides a set of intuitive image editing tools for editing images. One editing tool is a "red-eye" removal tool. To use the red-eye tool, a user should highlight the area of an image containing the red eyes and then clicking the red-eye tool. The user may also just click the red-eye tool without selecting an area of the image but better results will be provided when only a certain area of the screen is selected.

In order to prepare images for enlargement, the image-editing mode provides an image-cropping tool. In a preferred embodiment, the image-cropping tool allows the user to select the most common aspect ratios used for creating reprints. Specifically, the image-editing mode provides a cropping tool that can be locked in 3×5, 4×6, 5×7, and 8×10 aspect ratios. In this manner, the user can select exactly how an enlargement will appear as opposed to the current traditional photography system wherein the film developer crops the image as needed to obtain the aspect ration of the selected reprint size.

In one embodiment, the image-editing mode of the present invention creates a new image file containing all the edits applied by the user. However, the original file of the unedited image is still kept unaltered. In this manner, the user may go back and retrieve the original image if it is later needed.

Image Publication

After a user has organized and manipulated a set of images, the user may then wish to publish the organized and manipulated a set of images. The present invention provides an expandable system for publishing images. Specifically, the image organization and publishing system uses individual image-publishing modules of code to provide image-publishing services.

Three image-publishing modules are included in an initial embodiment of the present invention. Specifically, one embodiment includes a Photobook publication module, a World Wide Web Homepage publication module, and a photograph reprint publication module.

Photobook Publication

The photobook publication module allows a user to quickly and easily create an aesthetically pleasing photobook. The creation of a photobook will be described with reference to the flow diagram in FIG. 7 and the style sheets in FIGS. 8a to 8e.

Referring to FIG. 7, the user must first create and select a photo album as set forth in step 720. The creation of a photo album is described in the previous sections. The user the selects the desired photo album and enters the photobook publication module as set forth in step 730.

Next, in step 740, the user must select a photobook style. The photobook publication module contains a number of different photobook styles that may be selected. The photobook styles describe the overall appearance of the photobook that can be created.

Figure 8B:
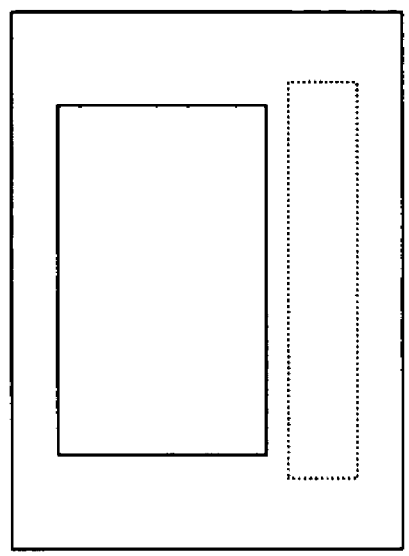
FIG. 8b illustrates a style sheet for a landscape image page.
Figure 8A:
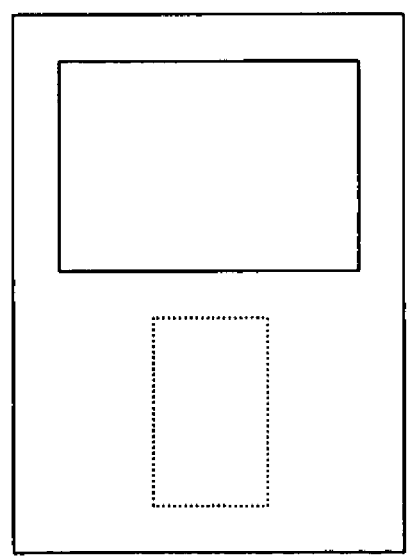
FIG. 8a illustrates a style sheet for a portrait image page.

Each photobook style consists of a series of different style sheets that describe how each page of the photobook will appear. FIGS. 8a and 8b illustrates two possible style sheets for a single image page in a photobook. Specifically, FIG. 8a illustrates a style sheet for a portrait image page wherein the solid line area is the location for the image and the dotted line area is for a caption associated with the image. Similarly, FIG. 8b illustrates a style sheet for a landscape image page.

Figure 8E:
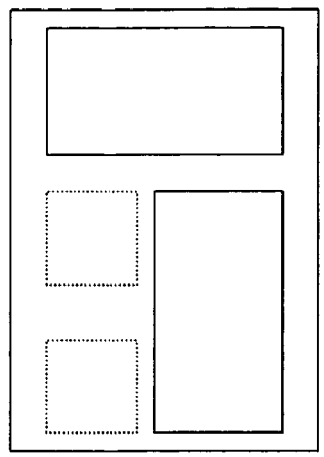
FIG. 8e illustrates a style sheet for a image page with a landscape image and a portrait image.
Figure 8D:
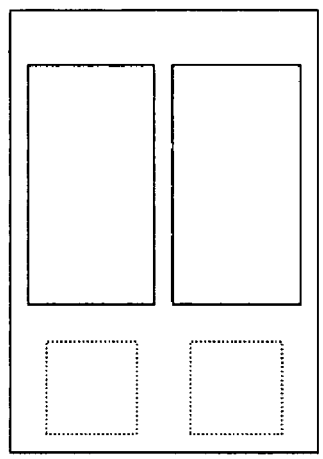
FIG. 8d illustrates a style sheet for a dual landscape image page.
Figure 8C:
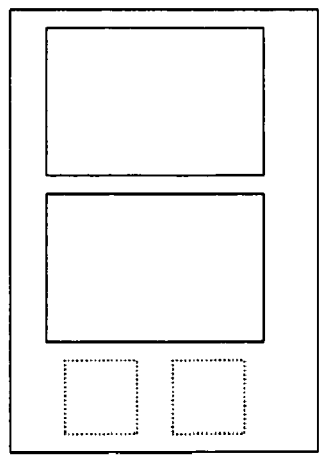
FIG. 8c illustrates a style sheet for a dual portrait image page.

FIGS. 8c, 8d, and 8e illustrate possible style sheets for a dual image page in a photobook. The style sheet of FIG. 8c is for two portrait images, the style sheet of FIG. 8d is for two landscape images, and the style sheet of FIG. 8e is for a page with one landscape image and one portrait image.

The photobook publication module fills in style sheet pages in the template photobook style until all the images in the photo album are exhausted. The photobook publication module automatically selects the proper style sheet depending on the image aspect ratio (portrait or landscape). If the number of images in the photo album does not match up perfectly, one embodiment of the present invention leaves the final page incomplete. In an alternate embodiment, the photobook publication module selects a style sheet with the exact number images needed for the last page.

Referring again to FIG. 7, the user may then manipulate the automatically formatted photobook at step 750. Specifically, the user should fill in the captions for the images. The user may reorder the pages in a photobook. The user may also reorder images or delete images from the photobook. In one embodiment, when the user reorders pages, reorders images, or deletes images in a photobook then the photobook publication module propagates the changes back to the photo album used to create the photobook.

In one embodiment, there is a "lock page" checkbox for each page in the photobook layout. The lock page checkbox can be used to prevent other changes made to the photobook from affecting the locked page. For example, if the user locks a particular photobook page and then deletes an earlier image, the images in the locked page will not be split up in order to fill in for the missing image. Instead, one embodiment of the present invention selects a style sheet with one less image needed for the page before the locked page. In an alternative embodiment, an image after the locked page will be moved in front of the locked page.

Finally, when the user is satisfied with the photobook layout, the user requests a final photobook formatting at step 760. In one embodiment, the photobook publication module processes the arranged photobook to create a Portable Document Format (PDF) file. Details on the Portable Document Format can be found from Adobe Systems, Inc. of San Jose, Calif.

After creating the final formatting of the photobook, the user may publish the photobook at step 770 by printing the photobook on a local printer. However, to obtain a hardbound photobook, the photobook publishing module allows the user to submit the formatted photobook directly to a custom book publisher across the Internet. Note that this system uses the locally available computing power to create the photobook such that a difficult editing session across a computer network is not necessary.

Home Page Publication

A user may publish their images on the World Wide Web using a World Wide Web Homepage publication module. The World Wide Web Homepage publication module operates in a very similar manner as the previously described photobook publication module.

Specifically, the user first selects a photo album and a template World Wide Web Homepage style. The World Wide Web Homepage publication module then generates a proposed World Wide Web Homepage. The user may then edit the proposed World Wide Web Homepage. When the user completes the editing of the proposed World Wide Web Homepage, the user may then submit the created World Wide Web Homepage to a World Wide Web hosting service.

Individual Print Publication

Finally, the user may publish images as individual prints. To publish a set of prints, a user selects a group of images from the main image review window 310 or selects a photo album from the photo album area 330 of FIG. 3 and then requests reprints. The photograph reprint publication module then displays an electronic order form to the user with the selected images. The user may then select the quantity and size of desired for each of the images. A "quick order" selection may be used to indicate a desired quantity for all the selected images. In one embodiment, the quick order selection also allows the user to select a desired size.

The foregoing has described an image organization and publishing system. It is contemplated that changes and modifications may be made by one of ordinary skill in the art, to the materials and arrangements of elements of the present invention without departing from the scope of the invention.

We claim:

1. A non-transitory computer readable medium storing an application that when executed by at least one processor implements a graphical user interface ("GUI"), the GUI comprising: a first display area for displaying different groups of images imported in the application during different import sessions; a photo album tool comprising a second display area for associating different sets of images from the first display area with different digital photo albums and displaying each particular digital photo album as a user selectable item, wherein a selection of a selectable item corresponding to a particular digital photo album causes the first display area to only display a set of images associated with the particular digital photo album, wherein the first display area displays all the images imported in the application when no selectable item corresponding to a digital album is selected; an image set grouping tool that when selected causes the images in the first display area to be grouped into the different groups according to the different import sessions by displaying a group divider icon between each of two different groups of images; and a set of editing tools comprising a redeye removal tool for removing redeye from a particular image selected from the first display area.

2. The non-transitory computer readable medium of claim 1, wherein the set of editing tools further comprises at least one of a rotate tool for rotating the particular image and a cropping tool for cropping the particular image.

3. The non-transitory computer readable medium of claim 1, wherein the red-eye removal tool allows a user to identify an area of the particular image containing a red eye.

4. The non-transitory computer readable medium of claim 1, wherein the photo album tool further comprises a control for creating a new digital photo album and displaying, in the second display area, a particular selectable item corresponding to the new digital photo album, wherein the GUI further comprises a third display area for displaying said control and at least one editing tool.

5. The non-transitory computer readable medium of claim 1, wherein the GUI further comprises a slide show tool, wherein a user's selection of the particular digital photo album and the slide show tool causes a slide show presentation comprising the set of images in the particular digital photo album to be displayed.

6. The non-transitory computer readable medium of claim 1, wherein the GUI further comprises a keyword association tool comprising (i) a keyword display area for displaying different keywords and associating different sets of images with the different keywords, and (ii) a filtering option that when applied causes the first display area to only display a set of images associated with a particular keyword, wherein the first display area displays all the images imported in the application when the filtering option is not applied for any keyword and no selectable item corresponding to a particular digital album is selected.

7. The non-transitory computer readable medium of claim 1, wherein images organized into a particular group of the different groups are the images imported in the application during one import session.

8. The non-transitory computer readable medium of claim 1, wherein a drag and drop operation of a set of images from the first display area onto the selectable item for the particular photo album associates the set of images with the particular photo album.

9. A method for an image organizing application that executes on a computing device, the method comprising: providing a first display area for displaying different groups of images imported in the application during different import sessions; providing a photo album tool comprising a second display area for associating different sets of images from the first display area with different digital photo albums and displaying each particular digital photo album as a user selectable item, wherein a selection of a selectable item corresponding to a particular digital photo album causes the first display area to only display a set of images associated with the particular digital photo album, wherein the first display area displays all the images imported in the application when no selectable item corresponding to a digital album is selected; providing an image set grouping tool that when selected causes the images in the first display area to be grouped into the different groups according to the different import sessions by displaying a visible group divider between each of two different groups of images; and providing a set of editing tools comprising a redeye removal tool for removing redeye from a particular image selected from the first display area.

10. The method of claim 9, wherein the method further comprises providing a slide show tool, wherein a user's selection of the particular digital photo album and the slide show tool causes a slide show presentation comprising the set of images in the particular digital photo album to be displayed.

11. The method of claim 9 further comprising providing a keyword association tool comprising (i) a keyword display area for displaying different keywords and associating different sets of images with the different keywords, and (ii) a filtering option that when applied causes the first display area to only display a set of images associated with a particular keyword, wherein the first display area displays all the images imported in the application when the filtering option is not applied for any keyword and no selectable item corresponding to a particular digital album is selected.

12. A non-transitory computer readable medium storing a computer program for processing a plurality of images on a device, said computer program comprising: a set of instructions for displaying, in a first display area, different groups of images imported during different import sessions; a set of instructions for associating different sets of images from the first display area with different digital photo albums; a set of instructions for displaying each particular digital photo album as a user selectable item, wherein a selection of a selectable item corresponding to a particular digital photo album causes the first display area to only display a set of images associated with the particular digital photo album, wherein the first display area displays all the images imported when no selectable item corresponding to a digital album is selected; a set of instructions for receiving a selection of a grouping tool; and a set of instructions for grouping, in response to the selection of the grouping tool, the images in the first display area into the different groups according to the different import sessions by displaying a group divider icon between each of two different groups of images.

13. The non-transitory computer readable medium of claim 12, wherein the computer program further comprises:
- a set of instructions for associating different sets of images with different keywords; and
- a set of instructions for displaying, in response to a selection of a particular keyword, only a set of images associated with the particular keyword.

14. The non-transitory computer readable medium of claim 12, wherein the computer program further comprises a set of instructions for editing a particular image selected in the first display area by removing redeye from the particular image.

* * * * *